United States Patent [19]

Kivits

[11] Patent Number: 5,202,740
[45] Date of Patent: Apr. 13, 1993

[54] METHOD OF AND DEVICE FOR DETERMINING THE POSITION OF A SURFACE

[75] Inventor: Cornelis M. H. M. Kivits, Eindhoven, Netherlands

[73] Assignee: U.S. Philips Corporation, New York, N.Y.

[21] Appl. No.: 523,965

[22] Filed: May 16, 1990

[30] Foreign Application Priority Data

Jun. 7, 1989 [NL] Netherlands ................ 8901442

[51] Int. Cl.$^5$ .............. G01C 3/08; G01C 1/20; G01B 10/06
[52] U.S. Cl. .................. 356/4; 250/201.7; 356/381; 356/382
[58] Field of Search ............ 356/4, 381, 382; 250/201.7

[56] References Cited

U.S. PATENT DOCUMENTS

| | | | |
|---|---|---|---|
| 3,016,464 | 1/1962 | Bailey | 356/381 |
| 3,715,165 | 2/1973 | Smith | |
| 4,725,722 | 2/1988 | Maeda et al. | 356/4 |
| 4,845,352 | 7/1989 | Benschop | 250/201.7 |

FOREIGN PATENT DOCUMENTS

| | | | |
|---|---|---|---|
| 0053804 | 3/1985 | Japan | 356/382 |
| 0897740 | 5/1962 | United Kingdom | 356/382 |

*Primary Examiner*—Stephen C. Buczinski
*Attorney, Agent, or Firm*—John C. Fox

[57] ABSTRACT

A light beam (21) is focused proximate to a (partly) reflecting surface (13, 14). The radiation reflected in the surface is split into two sub-beams and imaged on a radiation-sensitive detection system (50). The distance between the radiation spots formed on this system is determined and yields an output signal ($S_f$) which is a measure of the distance between the focus (22) and the reflecting surface (13, 14). By moving the focus up and down at a fixed amplitude which corresponds to the distance between focus and surface, at which the output signal is maximum, the amplitude of the output signal is also maximum when the up and down movement is symmetrical with respect to the reflecting surface. The presence of a second partly reflecting surface (13, 14) at a short distance from the first surface has a negligible influence on this amplitude.

3 Claims, 2 Drawing Sheets

METHOD OF AND DEVICE FOR DETERMINING THE POSITION OF A SURFACE

BACKGROUND OF THE INVENTION

The invention relates to a method of determining the position of a surface, which method comprises the following steps:

irradiating the surface with a radiation beam directed substantially perpendicularly to the surface and focusing the radiation beam by means of a focusing objective in a focus proximate to the surface;

periodically displacing the focus formed into a direction perpendicular to the surface around an average position;

detecting the radiation reflected by the surface on a radiation-sensitive detection system having a plurality of radiation-sensitive elements; and deriving a signal from the radiation distribution on the radiation-sensitive detection system, which signal is modulated due to said periodical displacement.

The invention also relates to a device for performing this method.

Such a method and device are known from Netherlands Patent Application NL-A 7,608,561. This Application describes a method of correcting the focusing error which occurs when reading an optical record carrier by measuring the focusing error by means of an optical scanning device and by subsequently correcting this focusing error. The focus is moved up and down around the position of the surface of the record carrier with a small amplitude, which is smaller than the depth of focus. As soon as the focusing error is zero, the frequency of the output signal of the radiation-sensitive detection system is twice the frequency at which the focus is moved.

This method is satisfactory if the radiation beam is substantially focused on the surface when the measurement is started. However, if upon the start of the measurement the focus is at a distance from the surface which is much larger than the amplitude of the displacement, this method is less suitable. This problem occurs, for example when the distance between two (partly) reflecting surfaces must be measured, between which surfaces the distance is so small that the position of the second surface must be measured through the first surface.

OBJECTS AND SUMMARY OF THE INVENTION

It is one of the objects of the invention to provide a method of determining the position of a surface which is present at some distance from the starting point for the focus.

It is a further object of the invention to provide a method of determining the position of a surface which is located close to another surface.

To this end the method according to the invention is characterized in that the amplitude of said periodical displacement is larger than the dept of focus of the focusing objective, and in that the surface and said average position are displaced with respect to each other until a maximum amplitude of the modulated signal is obtained. By determining the position of the surface, at which a maximum amplitude of the output signal of the radiation-sensitive detection system is obtained, it is simultaneously determined when the movement of the focus is symmetrical with respect to the surface. This is achieved by a measurement of the position of the surface. The presence of a second surface at a short distance from the first surface does not affect substantially the result of the measurement. The amplitude at which the focus is moved up and down is preferably equal to the distance at which the maximum output signal of the detection system is obtained.

It is another object of the invention to provide a method by which the distance between two surfaces can be determined. To this end the method according to the invention comprises the following steps:

irradiating the two surfaces with a radiation beam directed substantially perpendicularly to the surfaces and focusing the radiation beam by means of a focusing objective in a focus proximate to the surface;

periodically displacing the focus formed into a direction substantially perpendicular to the surfaces around an average position at an amplitude which is larger than the depth of focus of the focusing objective;

detecting the radiation reflected by the surfaces on a radiation-sensitive detection system having a plurality of radiation-sensitive elements; and deriving a signal from the radiation distribution on the radiation-sensitive detection system, which signal is modulated due to said periodical displacement; and displacing the surfaces and said average position with respect to each other until a first position at which a maximum amplitude of the modulated signal is obtained and subsequently displacing them once again to a second position at which a maximum amplitude of the signal is obtained.

By jointly displacing the two surfaces into the direction of the focusing objective or, dependent on the starting position, in a reverse direction, a maximum amplitude is detected twice. The mutual distance between the surfaces can thereby be measured with great accuracy.

According to the invention a device for performing the above-mentioned methods comprises a radiation source for generating a radiation beam, a focusing objective for focusing the radiation beam in a focus proximate to the surface to be measured, a radiation-sensitive detection system for detecting radiation reflected by the surface, the device further being provided with means for periodically displacing the objective over a distance which is larger than the depth of focus of the focusing objective, means for displacing the focusing objective and the surface with respect to each other, the detection system having an output which is coupled to an input of a detection circuit for detecting the amplitude of the modulated signal presented to the input.

BRIEF DESCRIPTION OF THE DRAWING

The invention will now be described in greater detail by way of example with reference to the accompanying drawings in which.

DESCRIPTION OF THE PREFERRED EMBODIMENT

Figure 1:
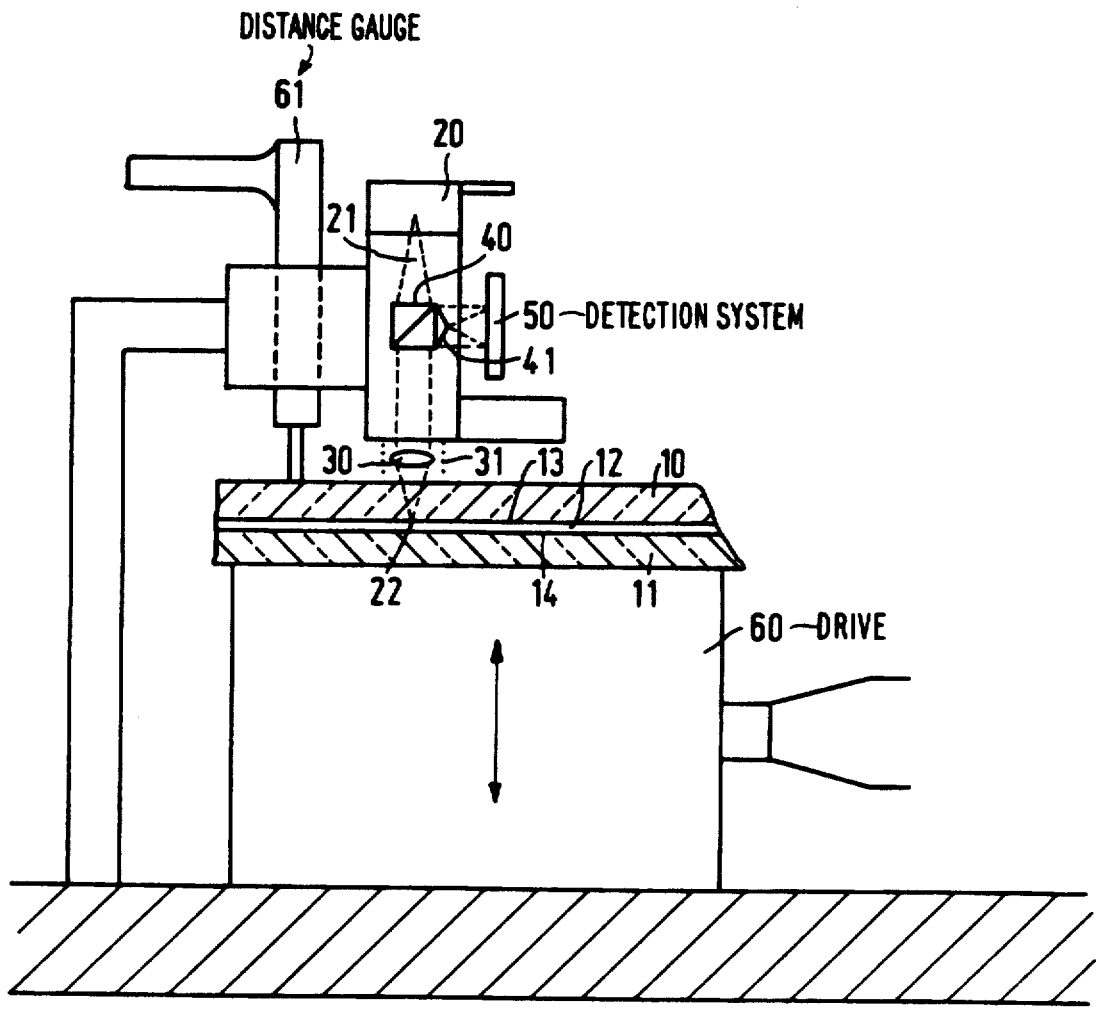
FIG. 1 shows diagrammatically an embodiment of a device according to the invention.

In FIG. 1 the reference numerals 10 and 11 denote two parallel glass plates between which a gap 12 is left.

The width of the gap 12 must be determined by measuring the mutual positions of the surfaces or boundary faces 13 and 14 of the glass plates.

The device for determining the positions of the boundary surfaces comprises a radiation source 20 in which a radiation beam 21 is generated. This radiation beam is focused by means of a focusing objective 30 in a focus 22 proximate to the surface whose position is to be determined. This surface reflects a part of the incident radiation, which part is incident on a radiation-sensitive detection system 50 via the focusing objective and a beam splitting cube 40. The detection system comprises a plurality of juxtaposed radiation-sensitive elements. The radiation path between the splitting cube and the radiation-sensitive detection system incorporates a roof prism 41 which splits the radiation beam reflected by the surface into two sub-beams. The distance between the radiation spots formed by the two sub-beams on the radiation-sensitive detection system is a measure of the distance between the surface and the focus 22.

By moving the objective system up and down by means of an electromagnetic actuator, for example, a coil 31 arranged around a magnet connected to the objective lens, the distance between the focus and the surface is varied, which is translated into a modulation of the output signal of the radiation-sensitive detection system.

According to the invention the up and down movement has a relatively large amplitude of approximately 2 $\mu$m. At this amplitude the spots formed on the radiation-sensitive detection system completely move from one radiation-sensitive element to another. As a result, the output signal for the radiation-sensitive detection system has a maximum amplitude when the up and down movement is symmetrical with respect to the surface to be measured. By moving the glass plates 10 and 11 towards or away from the focusing objective by means of a drive 60, and by determining the position at which a maximum output signal is obtained by means of an accurate distance gauge 61, for example, a TESA$^{200}$ gage, the exact position of, for example, the boundary surface 13 is measured. A further displacement of the glass plates to a subsequent maximum results in the position of the boundary surface 14. The distance between the two plates 10 and 11 and hence the width of the gap 12 can easily be determined from the two measured positions by means of subtraction.

It has been found that the gap width within approximately 50 nm can be determined by means of this method and device, even when the two surfaces 13 and 14 are only several $\mu$m apart. This situation occurs, for example, when measuring a liquid crystal display panel (LCD). The method is therefore eminently suitable for checking the quality of LCDs and particularly for verifying the parallelism of the inner surfaces of the glass plates of a single LCD.

Figure 2:
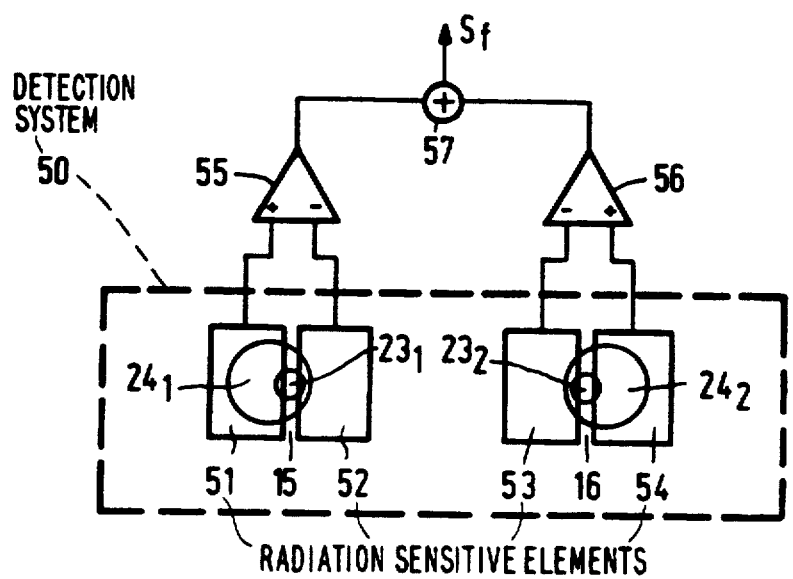
FIG. 2 shows how the spots formed on the radiation-sensitive detection system are displaced.

FIG. 2 shows the radiation distribution on the radiation-sensitive detection system due to reflection of radiation in the surface to be measured, and the splitting of the reflected radiation beam in the roof prism. The radiation-sensitive detection system 50 comprises four radiation-sensitive elements 51, 52, 53 and 54 which are juxtaposed pair-wise. If the focus 22 coincides with a reflecting surface 13 or 14, a radiation spot is projected for each pair on the boundary lines 15 and 16 between the two elements. The positions of these two spots are denoted by $23_1$ and $23_2$. As soon as the focus 22 is at some distance from the reflecting surface, the two radiation spots formed are moved towards or away from each other, dependent on the face whether the focus has been displaced downwards or upwards. In the new positions, denoted by $24_1$ and $24_2$, the majority of the radiation in each spot is incident on only one of the detection elements, the elements 51 and 54 in the Figure. The spots are larger in their new positions because the system is no longer in focus. By taking the difference between the radiation which is incident on the elements 51 and 52 and that which is incident on the elements 53 and 54 a focus error signal $S_f$ is determined which can be expressed in the intensities incident on the four detection elements:

$$S_f = (I_{51} - I_{52}) + (I_{54} - I_{53}),$$

at which $I_{51}$, $I_{52}$, $I_{53}$ and $I_{54}$ represent the radiation intensity incident on elements 51, 52, 53 and 54. This calculation can be performed by means of two difference detectors 55 and 56 and an adder circuit 57 which are coupled to the four detectors.

Figure 3:
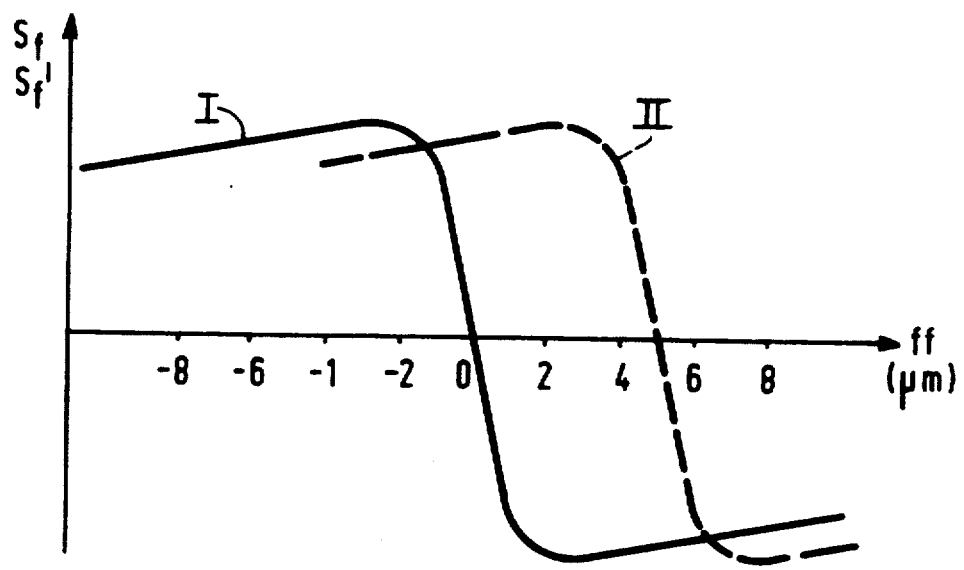
FIG. 3 shows how the output signal of the radiation-sensitive detector depends on the distance between the focus and the surface.

FIG. 3 shows the focus error signal $S_f$ by means of the curve I as a function of the distance between the focus and the reflecting surface. In the area where the radiation spots incident on the radiation-sensitive detection elements are entirely or partly incident on the boundary lines, there is a very strong dependence between $S_f$ and the distance between focus and surface, the focusing error ff. Outside this area, where each radiation spot is only incident on one of the detectors, the curve is substantially flat and further decreases when the radiation spots are displaced so far that they are incident outside the detection elements. In the case of an oscillation at an amplitude of approximately 2 $\mu$m symmetrically around the surface, the entire steep zone of the curve is substantially traversed at each up and down movement. The amplitude of $S_f$ is thus maximum. When the movement of the focus is not symmetrical with respect to the reflecting surface, only a part of the steep zone is traversed, while the signal $S_f$ is substantially independent of ff during the rest of the movement, so that the amplitude of the focus error signal is less than maximum.

If there is a second reflecting surface at only a few micrometers from the reflecting surface, the signal $S_f'$ generated by this second surface is completely in the flat part of the curve and thus cannot contribute to the amplitude of the output signal of the detection system. This signal $S_f'$ is denoted by the broken line curve II. In spite of the presence of this second surface, an accurate determination of the position of the first surface is thus possible.

By subsequently displacing the two surfaces, the position of the second surface can also be determined accurately without any disturbing influence from the first surface.

I claim:

1. A method of determining the position of a surface, which method comprises the following steps:
   irradiating the surface with a radiation beam directed substantially perpendicularly to the surface and focusing the radiation beam by means of a focusing objective in a focus proximate to the surface;
   periodically displacing the focus formed in a direction perpendicular to the surface around an average position;

detecting the radiation reflected by the surface on a radiation-sensitive detection system having a plurality of radiation-sensitive elements; and deriving a signal from the radiation distribution on the radiation-sensitive detection system, which signal is modulated due to said periodical displacement;

characterized in that the amplitude of said periodical displacement is larger than the depth of focus of the focusing objective and in that the surface and said average position are displaced with respect to each other until a maximum amplitude of the modulated signal is obtained.

2. A method of determining the distance between a first surface and a second surface arranged substantially parallel thereto, which method comprises:

irradiating the two surfaces with a radiation beam directed substantially perpendicularly to the surfaces and focusing the radiation beam by means of a focusing objective in a focus proximate to the surface;

periodically displacing the focus formed into a direction substantially perpendicular to the surfaces around an average position, at an amplitude which is larger than the depth of focus of the focusing objective;

detecting the radiation reflected by the surfaces on a radiation-sensitive detection system having a plurality of radiation-sensitive elements; and deriving a signal from the radiation distribution on the radiation-sensitive detection system, which signal is modulated due to said periodical displacement; and displacing the surfaces and said average position with respect to each other until a first position at which a maximum amplitude of the modulated signal is obtained and subsequently displacing them once again to a second position at which a maximum amplitude of the signal is obtained.

3. A device for performing the method as claimed in claim 1 or 2, comprising a radiation source for generating a radiation beam, a focusing objective for focusing the radiation beam in a focus proximate to the surface to be measured, a radiation-sensitive detection system for detecting radiation reflected by the surface, characterized in that the device is provided with means for periodically displacing the objective over a distance which is larger than the depth of focus of the focusing objective, means for displacing the focusing objective and the surface with respect to each other, and in that the detection system has an output which is coupled to an input of a detection circuit for detecting the amplitude of the modulated signal presented to the input.

* * * * *